J. E. FULLER & G. J. HATZ.
FORCE FEEDER FOR GREASE CUPS.
APPLICATION FILED DEC. 20, 1912.

1,065,517.

Patented June 24, 1913.

Witnesses;
J. Adolph Bishop.
C. S. Butler.

Inventors,
Charles E. Fuller,
George J. Hatz.
By F. A. Cornwall,
Atty.

UNITED STATES PATENT OFFICE.

CHARLES E. FULLER AND GEORGE J. HATZ, OF OMAHA, NEBRASKA, ASSIGNORS TO STERLING H. CAMPBELL, OF ST. LOUIS, MISSOURI.

FORCE-FEEDER FOR GREASE-CUPS.

1,065,517.   Specification of Letters Patent.   Patented June 24, 1913.

Application filed December 20, 1912. Serial No. 737,864.

*To all whom it may concern:*

Be it known that we, CHARLES E. FULLER and GEORGE J. HATZ, citizens of the United States, residing at city of Omaha, State of Nebraska, have invented a certain new and useful Improvement in Force-Feeders for Grease-Cups, of which the following is a full, clear, and exact description, such as will enable others skilled in the art to which it appertains to make and use the same, reference being had to the accompanying drawings, forming part of this specification, in which—

Figure 1:
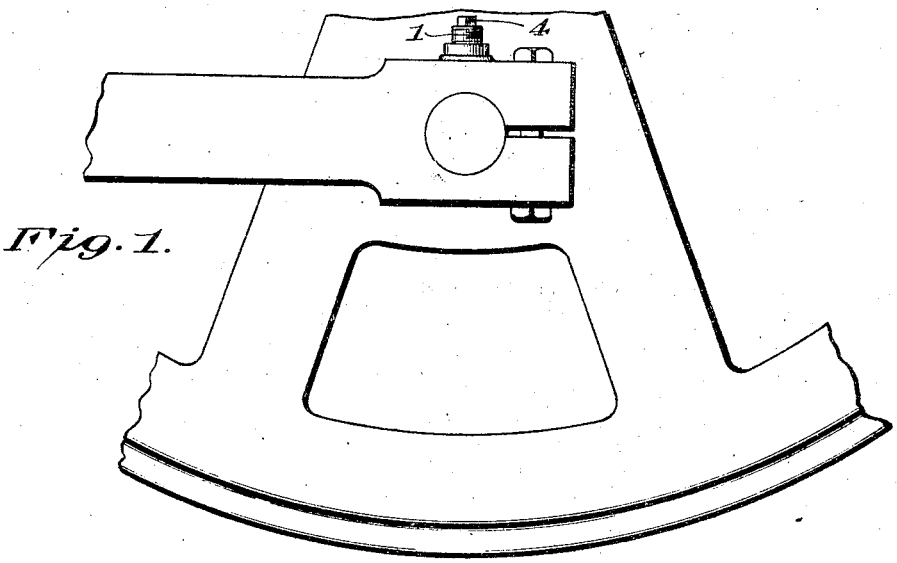
Figure 2:
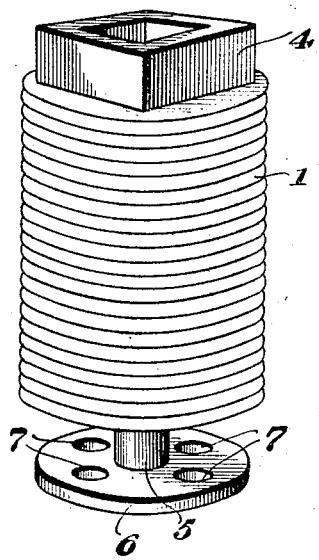
Figure 3:
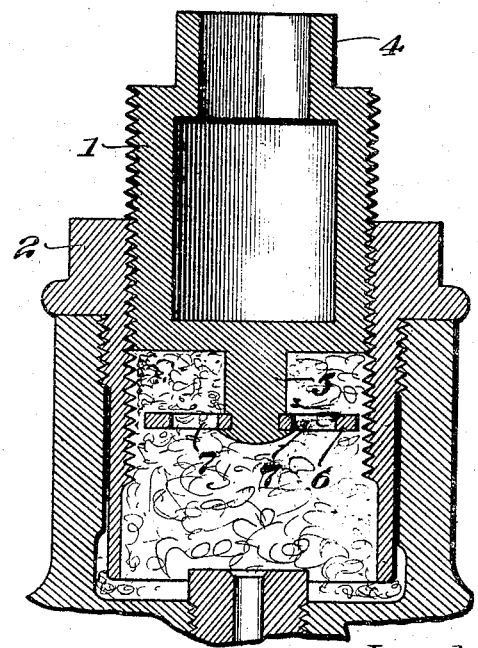

Figure 1 illustrates the application of our invention to the connecting rod of a locomotive. Fig. 2 is a perspective view of the force feeder. Fig. 3 is a vertical sectional view illustrating the application of our invention to a grease cup and its operation therein.

Our invention relates broadly to lubrication, and specifically to a form of force feeder for grease cups.

The principal object of our invention is to provide a force feeder having elements in its construction which insure it against being inadvertently dislodged from the grease cup and lost.

Another object of our invention is to provide a force feeder which is adapted to be retained by the grease within the cup against dislodgment from the cup.

Other objects of our invention will be in part obvious and in part pointed out by reference to the accompanying drawings wherein our invention is illustrated as comprising a feeding plunger 1 which is cylindrical in shape and which is threaded to engage the internal thread of the grease cup 2. At its upper end the plunger is provided with any suitable member 4 whereby it may be engaged to turn it in the grease cup. At its lower end, the plunger is provided with a spindle 5 preferably disposed centrally thereof. Upon the lower extremity of this spindle and removed from the lower face of the plunger is carried a disk 6. This disk is mounted so as to rotate on the spindle 5 and is provided with numerous apertures 7.

It frequently occurs that the feed plungers of grease cups which are subjected to considerable vibration are displaced from their cups by virtue of the fact that after the cups are freshly filled, the plungers can not ordinarily be screwed down into the cups more than three or four threads. This frequently does not furnish a sufficient engagement for the plunger and the vibration dislodges it from the cup. In the use of our improved feeder, however, this dislodgment is prevented by virtue of the fact that when the cup is filled and the plunger screwed into place, a certain amount of the grease will be forced through the apertures 7 in the disk 6 into the space between the bottom of the plunger and the top of the disk. This grease, in cohering to the grease below the disk through the aperture 7, will operate to anchor the disk in the grease and hold the plunger against displacement.

We claim:

1. A force feeder for grease cups comprising a screw threaded plunger provided at one end with means whereby it may be engaged to be rotated and having at its other end a projecting spindle, and a disk secured on said spindle apart from said plunger and adapted to rotate on said spindle, said disk being provided with apertures for the passage of grease.

2. In combination with a grease cup having an outlet, a force feeder comprising a plunger adapted to adjustably engage the grease cup, said plunger being provided with a spindle adapted to project within the grease cup, a comparatively thin disk rotatably secured on said spindle and spaced apart from said plunger, said disk being provided with an aperture for the passage of grease.

In testimony whereof we hereunto affix our signatures in the presence of two witnesses, this second day of December, 1912.

C. E. FULLER.
G. J. HATZ.

Witnesses:
JAMES T. BARRETT,
FRANK H. KORSTEN.